United States Patent [19]
Moore

[11] 3,884,521

[45] May 20, 1975

[54] LIGHT-WEIGHT, DURABLE, LAND-TRAVERSING VEHICLE

[76] Inventor: Alvin Edward Moore, Manini Way, Diamondhead, Rt. 1, Bay, St. Louis, Miss. 39520

[22] Filed: Sept. 24, 1973

[21] Appl. No.: 399,951

[52] U.S. Cl. ............... 296/31 P; 180/30; 293/1; 296/31 R
[51] Int. Cl. .............. B62d 21/00; B62d 29/04
[58] Field of Search .............. 296/28 R, 31 R, 31 P; 180/30; 9/2 R; 115/1 R; 244/119; 293/1

[56] References Cited
UNITED STATES PATENTS

| | | | |
|---|---|---|---|
| 1,484,410 | 2/1924 | Pridgen | 115/1 R |
| 1,906,114 | 4/1933 | Silverman | 244/107 |
| 3,110,515 | 11/1963 | Loftin | 296/28 R X |
| 3,443,776 | 5/1969 | Moore | 244/119 X |
| 3,559,923 | 2/1971 | Moore | 244/119 |
| 3,575,251 | 4/1971 | Moore | 115/1 |

*Primary Examiner*—Kenneth H. Betts

[57] ABSTRACT

An automobile, wheeled aircraft or space craft, trailer, hovercraft, snowmobile, sled or other vehicle adapted for travel over land, having strong, light-weight frames that include elongated, vehicle-bracing beams (longitudinal stringers or optionally transverse ribs), having holes in their faces, and sealed bottles or the like, each having a pair of necks (or a neck and bottom) that are strongly glued in opposite holes of a pair of the vehicle-bracing pieces. The holes preferably are sockets, recesses, or depressions that do not extend thru the stringers or ribs. The beams may be of metal, but preferably are of waterproofed "Masonite" or other pressed wood, or of strong, molded or extruded plastic containing sufficient pores or reinforcing fibers for frictional holding of nails, or of cedar, cypress or other wood. Optionally and preferably, the beams are curved in the direction of their length. On their outer and inner edges metal or strong-plastic mesh (preferably expanded-metal lath, hardware cloth and/or poultry-type fencing) is nailed or screwed and/or glued. And on this mesh outer and inner layers of stucco (Portland cement, epoxy or other cement mixed with fine aggregate or fibers) are applied in pasty condition (by troweling or spraying) and allowed to set. Between these stuccoed skins, foamed plastic, from poured-in-situ liquids, imbeds the hollow elements. The vehicle is preferably curved in fore-and-aft direction; optionally it may also be curved vertically (i.e., barrel-curved), in which event, the bottle-holding holes preferably extend entirely thru the beams. The bottle-holding holes may be on each side of each beam and may be staggered, preventing interference of the holes and bottles on the opposite beam sides. Preferably, the vehicle includes: a pair of lateral wheel or runner supports, each having a flat, fore-and-aft inner surface and a curved outer surface; between these surfaces of each support a freely rotating, resiliently mounted wheel or runner; a narrow, streamlined, central, wheel support; and a front steering wheel and a rear driving wheel on the central support. The side wheels or runners ordinarily are clear of the ground, but contact it on sidewise tilting of the vehicle. Lateral and front buffers include foamed plastic and balloons imbedded in the plastic. These and optional other balloons inside the cabin, floating against the top, aid gyroscopic force in preventing tilting of the vehicle.

26 Claims, 14 Drawing Figures

PATENTED MAY 20 1975

LIGHT-WEIGHT, DURABLE, LAND-TRAVERSING VEHICLE

This invention pertains to a light-weight, strong, land-traversing vehicle, little subject to damage in crashes. Either of the two disclosed inventive forms may be only for land-surface travel or, with the provision of wings and/or additional ballons (outside and attached to the top), may be a wheeled aircraft or spacecraft. In some respects the present invention comprises improvements of the inventor's prior U.S. Pat. No. 3,575,251 of Apr. 20, 1971.

This invention has, among other purposes, the following objectives: (1) a relatively light-weight but extremely strong vehicle, adapted to traverse land at least part of the time of its travel; (2) such a vehicle having walls including framework that comprises: strong beams, having holes extending at least partly thru each beam; and glass, plastic or metal bottle members, each having opposite ends that are glued in the holes, and strong skins fixed to outer and inner edges of the beams; (3) vehicle framework as in (2) above, each of the bottle members comprising a pair of used bottles having their bottoms glued together and their necks in the beam holes; (4) vehicle framework as in (2) above, each of the bottle members being a single, mold-formed bottle having two relatively small necks, one of which is integrally closed; and (5) a vehicle including a pair of side wheels, normally clear of the ground but contacting the ground on sidewise tipping of the vehicle, each of the side wheels being supported in a housing that comprises beams and gas-containing receptacles, fixed to the beams.

Other objects and the specific structure of the invention will be apparent in the following specification and the accompanying drawings.

Figures 1, 2, 3, 4:
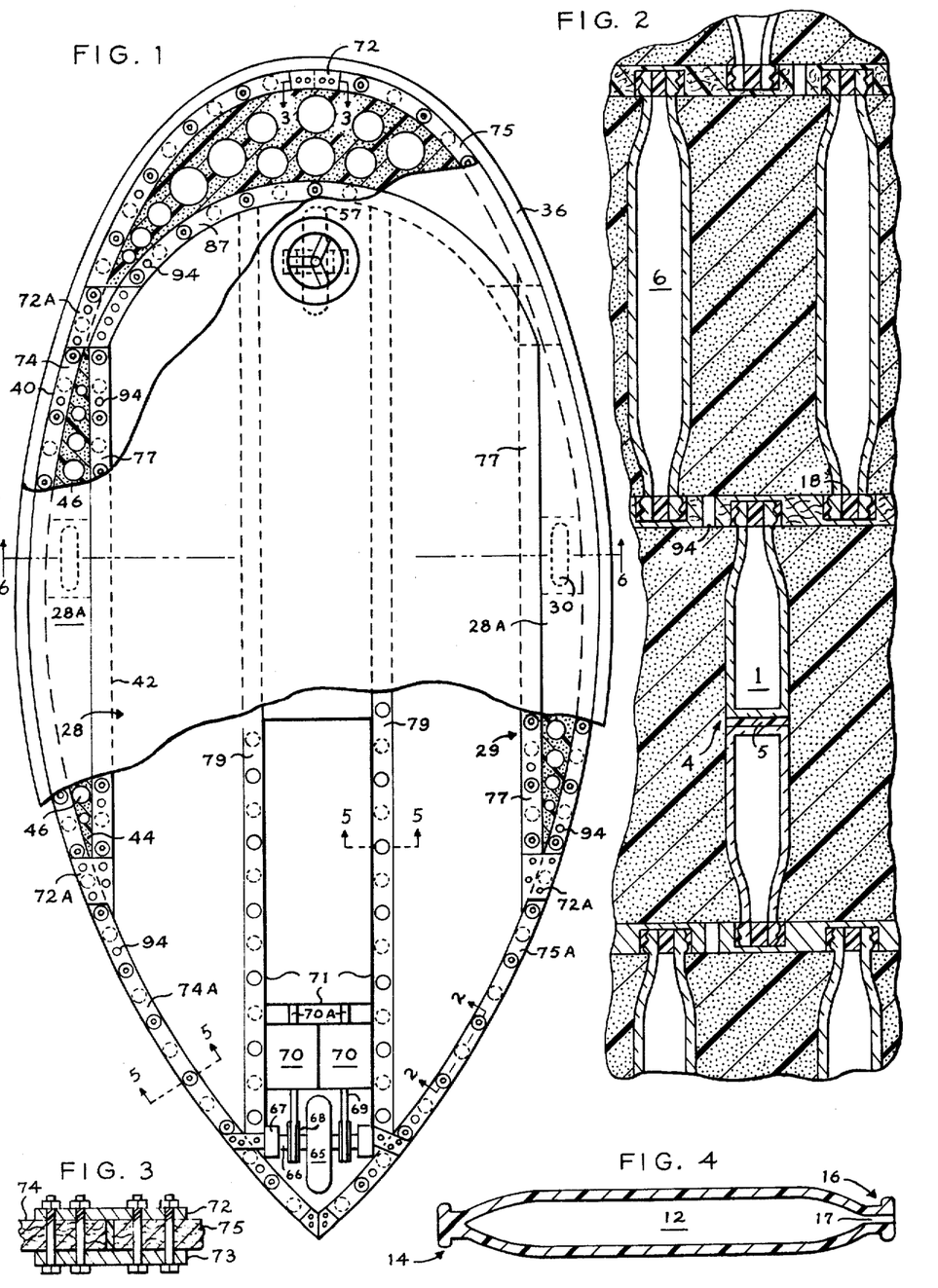
FIG. 1 is a top plan view of one form of the invention, partly broken away to illustrate a forward part of the vehicle in section from a plane comparable to that indicated at 1—1 in FIG. 6, and partly broken away to illustrate most of the rear part of the lower, wheel-supporting structure in section at this plane but showing the rear, driving wheel assembly in plan view (the foamed plastic is here shown as so far having been formed only in the lower, outer-wall buffer means).
FIG. 2 is a fragmentary sectional view on an enlarged scale from the line indicated by the arrows 2—2 of FIG. 1, showing two types of the bottle members, imbedded in foam plastic.
FIG. 3 is a fragmentary sectional view on an enlarged scale from the line 3—3 of FIG. 1, showing one form of the joints between end-to-end-joined beams.
FIG. 4 is a longitudinally sectional view of an optional, molded, glass or plastic form of the bottle members.
Figures 6, 6A:
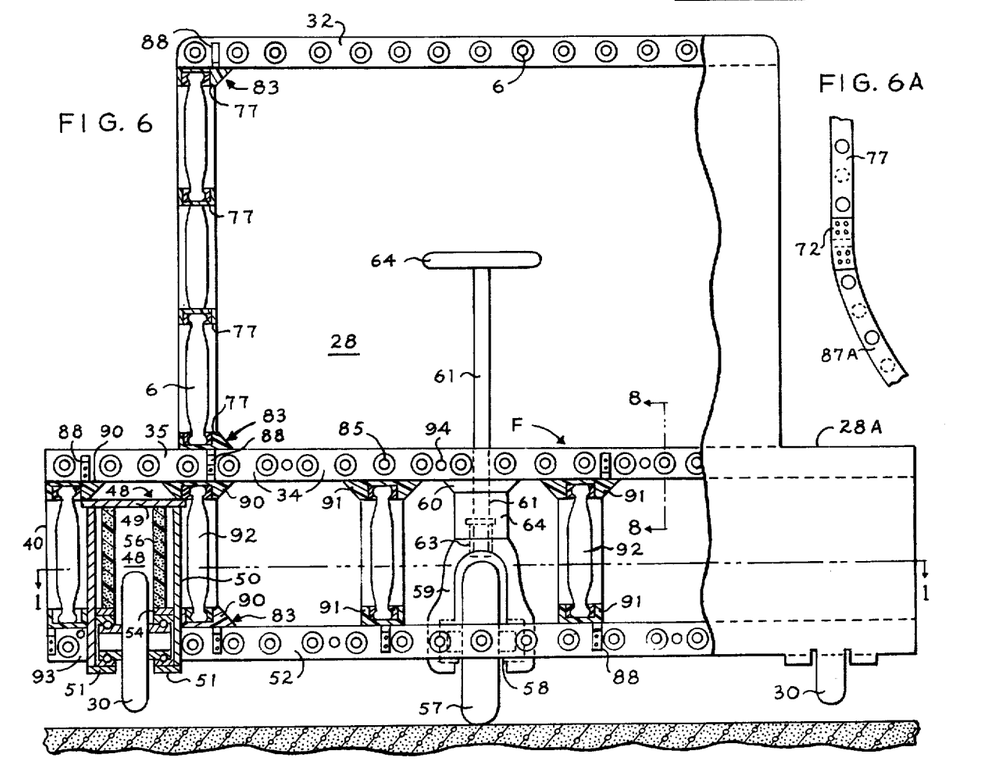
FIG. 6 is an elevational view of the vehicle before installation of the outer, resilient-tube bumper - this figure being partly broken away, and mostly in section from a plane comparable to that indicated at 6—6 in FIG. 1.
FIG. 6A is a fragmentary view, in section at a plane thru hollow members, illustrating the joints between the curved rear stringers and the straight stringers of the cabin walls.
Figures 10, 11, 12, 13, 14:
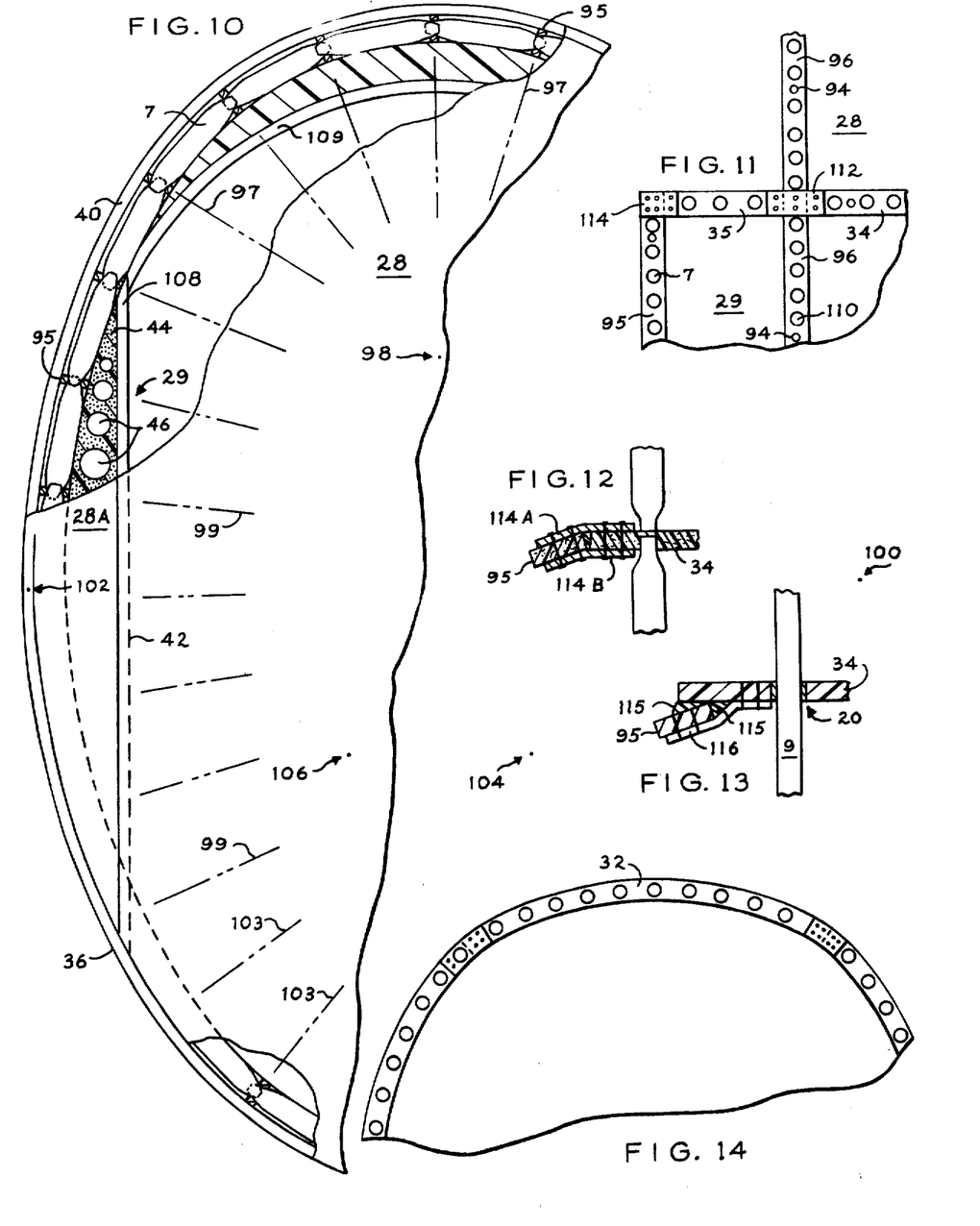
FIG. 10 is a partial top plan view of a second form of the invention (in which the beams are transverse ribs), partly broken away to illustrate internal structure below the floor level, showing foamed plastic as so far having been formed only in the lower-structure, outer-wall buffer means.
FIG. 11 is a fragmentary, elevational and sectional view of a lower left-hand portion of a variation of the vehicle of FIG. 10, from a vertical plane transverse to the middle part of the vehicle, before application of the foamed-plastic liquids and installation of the outermost, tubular bumper means.
FIG. 12 is a fragmentary sectional view, illustrating one form of the joints between end-to-end-joined beams.
FIG. 13 is a fragmentary view similar to FIG. 12 but showing a second form of the joint between beams.
FIG. 14 is a fragmentary sectional view from a plane comparable to the sectional plane of FIG. 11, showing the upper prat of an alternatively barrel-curved vehicular body.

One form of the invention is shown in FIGS. 1 and 6 and a second, optional form is shown in FIGS. 10 and 11. Each of these forms (optionally barrel-curved as indicated in FIG. 14) comprises rows of juxtaposed bottle members —each member being fixed to and between oppositely positioned beams and having ends that are glued in holes in the beams. Preferably, each beam has holes in each of its faces, these holes being staggered, the axis of each hole in one face being spaced from axes of holes in the opposite face; and the bottle members of each row that are glued to the holes of one of the faces are thus staggered in relation to the bottle members that are glued to the opposite face.

THE STRENGTH-PROVIDING HOLLOW MEMBERS

In each of the forms the bottle members (sealed, air-containing receptacles) may be made of glass, plastic, fiber-reinforced plastic, or thin metal. Optionally, these gas-containing, sealed hollow members may comprise: used or new bottles of a commonly known shape (indicated at 1 in FIG. 2 and 2 in FIG. 7); a pair of the bottles (shown at 4 in FIG. 2), having their bottoms glued together with epoxy putty or silicone or other rubber cement as indicated at 5 (or if the bottles are thermoplastic or metallic they optionally may be welded together), thus forming a bottle member having opposite necks that are glued with epoxy putty or other adhesive in holes of opposite beams; a single bottle, as at 2 in FIG. 7; an integral, dobule-necked, molded, glass or plastic bottle as shown at 6 in FIG. 2, or 7 in FIG. 10; or a cylindrical element of glass, plastic or metal as illustrated at 8 in FIG. 8, 8' in FIG. 9, and 9 in FIG. 13. When made of thin metal (for example, of aluminum, aluminum alloy or very thin steel) the receptacles optionally may be inflated with air or helium. Glass or plastic bottle members of the double-necked type, shown in FIG. 2 at 1 or 6, or 12 in FIG. 4, are currently preferred.

Figure 5:
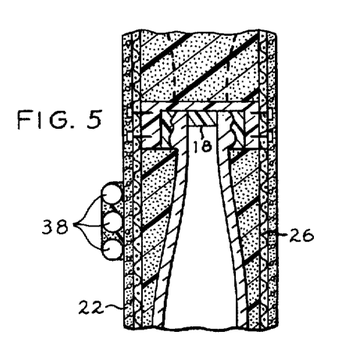
FIG. 5 is a fragmentary sectional view on a scale enlarged from that of FIG. 1, sectional from the plane 5—5 of FIG. 1, showing two of the staggered bottle members, having necks glued in sockets in a beam, imbedded in foamed plastic between stuccoed skins and flanked by vehicle bumper means.
Figure 7:
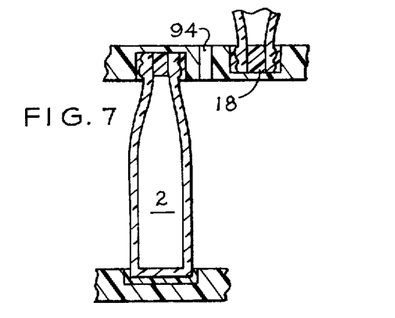
FIG. 7 is a fragmentary sectional view of a pair of beams (upright ribs or deck beams) and two bottle members, each comprising a single, preferably used bottle, having a neck fixed in a hole in one beam and a bottom fixed in a hole in the other illustrated beam.
Figure 8:
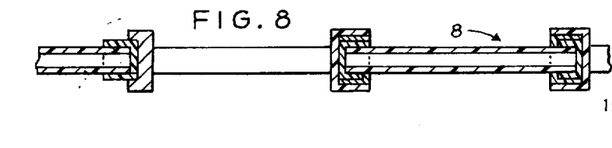
FIG. 8 is a sectional view of another form of the bottle members, comprising staggered, sealed pipes, having ends glued in holes of beams.

The bottles 6 of FIG. 2 and 12 of FIG. 4 are preferably made in a mold; and when they are of glass they are blown in accordance with known glass-blowing technique. The bottle 12 (illustrated as of plastic, but optionally of glass) has one integrally closed end (14) and another end (16) which has a small opening 17. When made by centrifugal molding both of these ends may be closed. Use of this double-necked type of bottle member (4, 6, 12) has an advantage over use of the single-necked bottle 2 of FIG. 7 because the two relatively small necks fit into relatively small holes in the beams. When the hollow members have open ends these ends are preferably sealed by bits of epoxy or other adhesive 18 (FIGS. 2, 5 and 7). In accordance with the preferred method of assembly of the hollow members and beams: epoxy putty, epoxy liquid or other adhesive is placed in each hole or socket in a beam, filling half or more of the socket; the open neck or other open hollow-member end is forced into the socket and adhesive; and the portion 18 of the glue goes into the open end. Also there is preferably sufficient clearance around the hollow-member end for adhesive to be forced around this end.

THE CAR-BRACING, HOLLOW-MEMBER-HOLDING BEAMS

Figure 9:
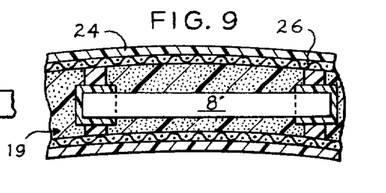
FIG. 9 is a fragmentary sectional view indicating the foam-plastic-imbedded bottle members as having ends extending thru holes which are apertures thru beams.

As exampled in the drawings, these beams may be straight or curved. They may be of extruded aluminum alloy, thin steel or other metal, but preferably they are of: waterproofed "Masonite" or other pressed wood; strong, molded or extruded plastic (preferably containing sufficient pores or reinforcing fibers for frictional holding of nails or screws); or cedar, cypress or other wood. The hollow-member-holding holes in the vehicle-bracing members optionally may extend all the way thru the beams (as exampled at 19 in FIG. 9 and 20 in FIG. 13). In FIG. 9 the vehicle is indicated as curved in at least one direction, but optionally it also may be curved in a direction normal to that of the illustrated curvature, as indicated in FIG. 14 (in other words, the load-holding body may be barrel-curved). In this event, and when standard bottles of a single length are utilized, it is necessary to provide bottle-holding holes that extend all the way thru the beams, because the bottle-member ends at the points of lesser bulge of the barrel-curved body necessarily must project farther into and thru the holes than the extent of projection at points of greater bulge. These bottle-member ends perferably are the smaller necks of double-necked bottle members.

THE VEHICLE SKIN MEANS

Exterior and interior skin means are fixed to exterior and interior edges of the beams. Although these skins may comprise thin, solid, sheet plastic or metal, they preferably are of strong, waterproofed stucco on mesh. This stucco in each instance optionally may comprise: Portland cement (preferably a mixture of Portland cement and lime) and fine aggregate or fibers (as indicated at 22 in FIG. 5); or epoxy, liquid rubber or other plastic cement or putty (as indicated at 24 in FIG. 9). This stucco may be troweled and/or sprayed on the mesh 26. After it is set it is sanded to form a smooth, streamlined surface, and then coated with two or three coats of waterproofing paint. When the cement comprises Portland cement this coating preferably comprises two coats of "STA-DRI" concrete paint, optionally topped by epoxy enamel.

The mesh 26 preferably is expanded-metal lath (of steel or aluminum alloy), but optionally it may be hardware cloth alone, hardware cloth covered with a ply of poultry-fence wire, two or more plies of metal fencing, or strong plastic network. In any event, the mesh should be sufficiently resilient to bend in a curve between beams. When the beams are of the type that frictionally hold nails, the mesh is nailed (or screwed) to them; but when they are of extruded metal the mesh is attached to them by screws extending into screw holes. In any event, the mesh preferably is further secured to the beams by bonding material (epoxy putty, other adhesive, or optionally by welding or brazing if the beams are metallic).

THE PASSENGER CABIN AND THE SHOCK-ABSORBING, STEP-PROVIDING UNDER STRUCTURE.

As indicated in FIGS. 1, 6, 10 and 11, the cabin or passenger carrying compartment 28 is spaced from and within the outer, shocktaking, forward and lateral outlines of the vehicle. This arrangement provides: wide, curved, front and lateral buffers; running-board-like stpes 28A at the sides of the vehicle; and a housing and wheel support 29 for each of the side wheels 30. The cabin 28 includes numerous parallel, bottle-member-connected top beams 32 and numerous parallel, similar floor beams 34, which have integral extensions 35 that form the main bracing elements of the side steps, side buffers and side-wheel supports.

The main, forward and lateral, life-protecting buffers are within the resilient bumper 36, which preferable extends entirely around the vehicle. As indicated in FIG. 5, this bumper may comprise parallel lengths of rubber hose 38 of the type used in fire-fighting equipment, within a flexible waterproof skin. The ends of each of the looped lengths are sealingly and abuttingly joined at the rear end of the vehicle by epoxy putty or other adhesive. This bumper absorbs minor shocks, but will transmit the major force of a bad crash to the main, lifesaving buffer means.

As illustrated, this buffer means comprises: outer assemblies of beams and bottle members, sheathed in a curved skin 40; inner bracing members having a planar skin at 42; foamed plastic 44 (preferably rigid or semi-rigid), between the outer and inner skins; and sealed hollow elements 46, imbedded in the foamed plastic. These hollow elements may be helium balloons (lighter than air), or cans, or frangible elements of glass; preferably they are balloons. This main buffer means thus provides steps and fenders; and also in the emergencies of crashes it protects the lives of passengers by the following bulwarks against outside force: the strong outer skin 40 (preferably stucco or strong mesh); the outer assemblies of beams and bottle members; the foamed plastic 44; the hollow elements 46; the inner, straight bracing members; and the strong inner skin at 42 (preferably stucco on strong mesh).

Imbedded in the foamed plastic 44 of each of the side steps and main lateral buffers, there is a side-wheel housing 48. This housing comprises a plurality of strong housing walls which are illustrated as plates (49, 50 and 51) of strength-providing material (preferably of steel), welded or otherwise fastened together. Each of the upper plates 49 and the lower plates 51 bridges the space between two of the parallel beams and is fastened to them. Each of the lower plates 51, one on each side of each side wheel, may be planar, but as illustrated it has a central saddle portion, projecting downward from the plane of the lower edges of the beams 52. On each of these saddle portions an outer race of the antifriction bearing of the axle of the adjacent sidewheel 30 rests during normal, straight, forward travel over pavement. But when the vehicle tilts sidewise by a predetermined degree (for eample, in going around a sharp curve) an side wheel contacts the ground, and it and its assembly shock-absorbingly move upward. The balloons 46 and optionally other ballons inside the top part of the cabin of the type referred to in the inventor's prior U.S. Pat. No. 3,575,251 aid gyroscopic force in normally keeping the side wheels clear of the pavement during straight travel. The centralized main weights on the vehicle also aid in achieving this balance.

The side-wheel assembly further includes a parallel pair of upper saddle plates 54, each of which is fixed to an outer bearing race (preferably curvingly contacting this race) and fixed also to lower surfaces of a shock absorber. The shock absorbers may be of any known type of shock-absorbing devices; but they are somewhat schematically exampled in FIG. 6 as comprising flexible, waterproof sacks or skins and strongly resilient foamed plastic 56 enveloped by each of the skins.

Windowed doors are provided in each of the cabin sidewalls, adjacent to and accessible from the steps 28A.

THE MIDDLE UNDER STRUCTURE, PROPULSION AND STEERING

In each form of the vehicle the aligned steering and driving wheels and the vehcile's power means ae supported above the lower beams 52 and between lower-structure sidewalls which bracingly connect the beams 34 and 52. The forward wheel 57 and its steering mechanism are somewhat similar to the front wheel of a motorcycle. This steering means, in addition to the wheel 57 and its axle, comrpises: antifriction bearings 58; the rotatable fork 59, in the lower ends of which the outer races of the bearings 58 are held; the metal bar 60 (optionally channeled) which bridges the space between and is fixed to two of the parallel beams 34; the steering-post shaft 61 which is journalled in radial-and-thrust bearings mounted in or on the bar 60 and has lower, annularly-arranged teeth or tongues which at 63 fit in grooves or valleys between similar teeth in the upper end of the fork 59, these cooperating teeth allowing the fork and wheel to move upward under shock, but preventing rotation between the fork and shaft 61; the shock absorber 64 (of any appropriate known type), which absorbs shocks on the wheel and fork, cushioning their upward movement relatively to the shaft 61; and the steering wheel 64 (or equivalent motorcycle-type handle bars).

The rear, vehicle-driving assembly comprises: the rear wheel 65; the axle 66, fixed to 65; bearings and a shock absorber (67) on each side of the wheel; sprocket wheels (or equivalent worm wheel or other gear) 68; the sprocket chains (or worm shafts) 69; and the motor means, driving the power-transmission means 69. This motor means may comprise a single motor or the two motors 70, each of which drives one of the chains or shafts 69. Each of these motors may be any known type of electric or fluid motor of fueled engine. In any event, the motors are connected by tubular means 70A with a source of energy, 71. This source may comprise a plurality of electric batteries, a compressed-air or steam storage means or, when the motors are hydraulic, an internal combustion engine and liquid pump.

When the invention is embodied in an aircraft, hovercraft or space craft, the vehicle may be steered and controlled by known airplane controls and may be propelled by an air propeller and/or rockets in a known manner. This propulsion may be in addition to or in lieu of the driving means illustrate in FIG. 1. Preferably, the ground-traction drive is utilizied; but if it is eliminated the rear wheel 65 is rotatably mounted in structure similar to the supports for the wheels 30.

THE CURRENTLY PREFERRED EMBODIMENT

The form of the invention shown in FIGS. 1 and 6 comprises substantially horizontal, fore-and-aft stringers and transverse deck beams that are rigidly connected to the elongated stringers. Each of the sets of joined stringers that are at the same level preferably consists of a plurality of end-to-end-joined beams that are united by epoxy putty or other adhesive and reinforced at the joint by upper and lower splicing plates (72 and 73, FIG. 3) bolted or riveted to the abutted ends of the stringers. Optionally, the curved outer stringers at each level may be four in number, 74, 74A, 75, 75A; and four pairs of the splicing plates thus are used, two of these pairs being located at or near the vertical plane 6—6. When the vehicle is short (for example less than 20 feet in length) the stringer elements 74 and 74A may be integral, and likewise the elements 75 and 75A may be in one piece. The straight stringers 77 (some of which are part of the outer side walls of the cabin) and the straight stringers 79, or 91 in FIG. 6, (which brace only the lower structure below the floor) also may be into two parts or integral. Their ends closely fit edges of the curved stringers (87, 74, 74A, 75, 75A) which extend jboth above and below the floor, and are reinforced by and between top splicing plates 72A and lower plates that are bolted to the stringer ends and these top plates. The joint between each pair of abutting stringer ends is preferably reinforced not only by the plates and bolts (or screws), but also by epoxy putty or other strong bonding materials. The fore-and aft stringers that are fastened to the transverse beams of the top, the floor and the lower, wheel-and-motor-supporting structure optionally are beveled, as at 83, for extra strength and ease of fastening to the transverse beams.

Before the final vehicle assembly, bottle members (or other hollow elements) preferably are bonded in subassembly operation in sockets of those floor beams that have sockets at opposite faces of each beam, these beams being arranged in construction-unit pairs of beams, each pair connected by bottle members. In this operation: (1) one of the beams is horizontally placed flatwise in a fixture; (2) epoxy or silicone-rubber cement or other adhesive (optionally in liquid or pasty form) is placed —but preferably by pouring it - in the upwardly opening sockets; (3) a bottle-member neck is placed in each socket and its associated adhesive; (4) the second beam of the unit is horizontally placed flatwise in a second, nearby small fixture; (5) epoxy, rubber cement or other adhesive is now placed (preferably by pouring it) in the upwardly facing sockets of this second beam; (6) before the glue of the above step (2) completely sets (while it will not run but is flexible and strong enough to hold depending bottle members) the beam and bottle members of steps (1) to (3) are turned upside down, and the free ends of the depending bottle members are placed downward into the glue and sockets of step (5); and (7) after the glue of sub-assembly step (6) sets the completed unit is removed from the fixture.

And preferably before the final assembly, bottle members (or other hollow elements) are bonded in sub-asesembly operation in sockets of those cabin-wall stringers or beams that have sockets at opposite faces of each beam, and also are bonded in sockets of the topmost tier of the cabin-wall-frame units, the beams of this topmost tier having sockets only in their lower faces. Each of these sub-assembled cabin-wall units comprises only one beam and bottle members that have ends which are glued in sockets of only one of its faces, the other ends of these bottle members being temporarily free and unattached. These cabin-wall units are made in accordance with steps (1) to (3) and (7) of the above described sub-assembly method.

Preferably also in sub-assembly: the angled brackets 88 are fastened by bonding material and bolts or screws to portions of the transverse floor beams; and the fore-and-aft stringers of the wheel-supporting under structure (each having sockets at only one of its faces) are assembled in pairs, with the necks of their associated bottle memebers glued in their oppositely facing sockets. These beams and hollow members of the wheel-supporting under structure are thus formed into units or sets, each comprising two parallel beams that are joined by bottle members or the like which have their ends bonded in holes on oppositely facing sides of the two beams. On the other hand, each of the sub-assembled units of the upper cabin-sidewall structure has only one beam, with holes at one of its faces filled with bottle-member ends, while the holes at its other face are temporarily empty.

The final assembly of the invention species of FIGS. 1 and 6 may comprise the following steps, beginning with construction of the upper, cabin part (in these steps, double-necked bottle members are referred to, but other hollow members may be substituted for them):

1. The forward, sub-assembled set of two parallel floor beams 34–35 and the bottle members 85 that are glued to and between their oppositely-facing sockets is laid in a beam-positioning fixture. The forward one of these beams (to be immediately to the rear and below the forward portion of a curved stringer 87) is short, has no sockets in its forward face, and is normal to the longitudinal axis of the planned vehicle.

2. Epoxy putty or other pasty adhesive is palced in the sockets at the rearward face of the after beam of step (1), these sockets having been left empty in the sub-assembly operation. Necks or separate, non-attached bottle members (the forward neck of each of these members) are now placed in these after sockets and in the adhesive, the bottle members being held with their axes horizontal by portions of the fixture. The rearward necks of these members are temporarily free.

3. A second set of two of the floor beams and hollow members is positioned in the fixture substantially to the rear of the forward set. Pasty adhesive is placed in the sockets at the forward face of the forward beam of this second set and the set is moved forward until these adhesive-packed sockets are forced around the said rearward necks and the glue is in position to seal the necks in place.

4. Steps (2) and (3) are repeated until the last set of floor beams and bottle members is installed, a little forward of the rearmost portion of the vehicle. The rear beam of this last set is the shortest of the floor beams; it has no sockets at its rear face.

5. The first set of five flatwise stringers above the floor level (the curved flatwise forward beam 87, the two straight stringers 77 and the two rear curved stringers 87A (FIG. 6A) are bonded with epoxy putty or other bonding material across the parallel, transverse floor beams. These five flatwise beams are further fastened to the floor beams by screwing and bonding the angle irons 88 to them (these angles preferably having been attached to the floor beams in sub-assembly). The abutting ends of these five beams are also fastened to each other by bonding material, plates 72 and 73 and bolts thru the plates and beams. The plates jointing the rear ends of the straight stringers 77 to the forward ends of the curved rear stringers are not shaped like the lower-structure plates indicated at 72A in FIG. 1. Here, above the floor level, the curved rear stringers are shaped and terminate as indicated in FIG. 6A. They abut and are bonded to blunt rear ends of the stringers 77, thus providing a somewhat streamlined joint, further strengthened by the bolted plates 72 and 73.

6. The first sets of stringers and bottle members above the floor F ae installed and glued in place. Each of these sets comprises a co-level group of the five flatwise beams (87, 77 and 87A) and five co-level rows of bottle members of an above-described type, the necks of which have been sub-assembly-glued to the sockets at the lower face of each associated stringer. In the beginning of the frame-assembly operation the bottom members and depend below the associated stringer. Epoxy, silicone rubber sealant or other adhesive (prefearably in liquid, purable condition) is placed in the upper sockets of the beams, and into these sockets, in each stringer, the lower free ends of the bottle members sockets, in each stringer, the lower free ends of the bottle members are fitted, down into the adhesive. Then the beams of this first set of beams and bottle members above the floor are securely fastened together by epoxy and the plates 72 and 73.

(7). Steps like step (6) are now performed, building the wall framework up to the lower line of the beams of the top.

(8). The top assemblies of the horizontal beams 32 and associated bottle members are installed in the manner of step (1). The beams 32 are fastened to the top set of wall beams 87, 77 and 87A by epoxy or other binding material, brackets 88 and bolts, U-bolts, nails, or the like.

(9). The partially-built framework is now turned upside down and construction of the wheel-housing under structure is begun. The sub-assembled sets of stringer 90 and 91 and bottle members 92 are placed across the beams 34 and fastened to these beams by angle irons 88 and bonding material. These stringers 90 and 91 have sockets only on their oppositely facing surfaces.

(10). The co-level horizontal beams 52 and short pieces 93 (the latter having only one bottle member between each adjacent pair of the pieces) are placed across the stringer 90 and 91 and fastened to them by bonding material and angle irons 88.

(11). The sub-assembled side-wheel housings 48 and the wheel assemblies supported by them are fixed to the beam portions 35. And the central wheels 57 and 65 and their assemblies of bearings and supports and the detachably secured motor means and energy source means are installed (before step (10)) between the fore-and-aft rows of stringers 91 and their associated bottle members.

(12). The outer skins 40 are applied to the outer edges of the elements 35 and 93 and the stringers 90, between 35 and 93; and inner skins are attached to inner edges of the interior stringers 90 and 91. These skins may be of sheet plastic or sheet metal, but are preferably of mesh and stucco of the above described type and are fastened in the above-described manner.

(13). Mesh is fastened to the in-use lower edges of the beams 52 and pieces 93; and stucco is troweled or sprayed on this mesh, forming the lower vehicular skin.

(14). The spaces in front and to the rear of the wheel housings 48 are filled with in-situ-applied foamed plastic liquids.

(15). The framework is now reversed into its normal position in use; and the exterior and interior skins above the floor beams (including the floor surface skin) are formed— preferably of mesh and stucco, as above described.

(16). Foamed-plastic liquids are inserted thru temporary holes in the skins and around all the bottle members. The foaming liquids go thru the holes 94 in the beams and thus to all spaces between the skins.

(17). Installation of the above-described bumper 36, glued to outer surfaces of an upper portion of the under-structure skin, completes the vehicle.

THE EMBODIMENT OF FIGS. 10 AND 11

The main difference between the invention form of FIGS. 10 and 11 and that of FIGS. 1 and 6 is the fact that in the species of FIGS. 10 and 11 the beams of the vehicle walls are upright ribs instead of horizontal stringers and the bottle members 7 (or other hollow elements) have horizontal axes and ends that are glued in holes in the ribs. As shown in FIG. 11, the upper ends of the upright ribs 95 and middle portions of the ribs 96 are fastened to the composite floor-and-step beams (34, 35) by epoxy putty or other bonding material, angled brackets, and between pairs of the splicing plates 112 and 114. The upper ends of the ribs 96 are similarly fastened to the horizontal top beams 32 (FIG. 6). And the lower ends of the ribs 95 and 96, on each side of the vehicle, are thus fastened to the under-structure, horizontal beams 52 and the short pieces 93 that are at the side-wheel housings.

Each adjacent pair of the parallel floor-and-step beams 34-35 of FIGS. 10 and 11 are connected by bottle members or other hollow strength providing members that are strongly glued in beam sockets in the above-described manner. When not curvingly arranged in fore-and-aft direction, the ribs 96, being parallel, also preferably have sockets in which bottle-member necks are glued. And the bottle members or other receptacles 7 on the concentric, non-parallel ribs 95 optionally also may be connected by sockets containing glue and receptacle ends; but as exampled in FIG. 10 these members 7 on the ribs 95 have their ends glued in holes extending all the way thru the ribs.

The ribs 95 are radially positioned about five centers of curvature. The middle planes of the bow ribs hae radii 97 that are centered at the vertical line of point 98. The middle planes of the ribs on the left side have radii 99 that are centered at the point 100. Middle planes of the right-side ribs have radii that are centered at 102; those at the left of the rear end have radii 103, centered at 104; and those at the right of the rear end have radii that are centered at 106.

In FIG. 10 the straight fore-and-aft beams 108 and the curved beams 109 (fastened together by epoxy putty, welding or other bonding material) are pipes of metal or plastic (optionally of thin resilient steel, or resilient or rigid plastic, or inflated, air-pressure-stiffened flexible plastic tubes of the type used in plumbing). They are fastened by epoxy putty and metallic pipe strap or metal bars, screws, bolts, U-bolts or the like to inner edges of the ribs and/or to the expanded metal or other material of the strong inner body skins. But preferably, and as indicated in FIG. 11, the straight fore-and-aft-wall parts of the under structure and the cabin walls comprise the upright ribs 96 of the above-described type and the hollow elements 110. And preferably also, the curved forward-wall beams 87 of FIG. 1 and the upright hollow members associated with them, these beams having ends that are joined by angle irons and bonding material to edges of a forward pair of the ribs 95, are utilized instead of the pipes 109.

The beam joints comprising the pairs of opposite plates 112 are like the joint of FIG. 3, comprising a similar pair of plates 72 and 73. But the joints between the concentrically-arranged ribs 95 and the parallel floor beams (comprising pairs of plates) are optionally made as illustrated in FIG. 12 or FIG. 13. In FIG. 12 the transverse floor beam (34, for instance) has abutting linear contact with and is bonded by epoxy putty or the like to the upright rib 95. And this joint is braced by the parallel plates 114A and 114B, which are fastened by epoxy putty or other bonding material and by bolts or the like to the beam and nib. In FIG. 13 the end portions of the beam 34 and rib 95 overlap slightly and are glued together with epoxy putty or the like, 115. Here, only one plate, 116, bolted separatedly to the beam and rib, braces the joint.

Within the spirit of the invention, various changes in the specific structure illustrated may be made. For example: in an aircraft wings may jut thru and out of upper openings in the cabin sidewalls, or ballons may be inside of the compartments in the invention form of FIGS. 10 and 11; these ballons may be in the upper part of the cabin or attached to the outside of its top; and the outer configuration of either of the disclosed forms may be barrel-curved, or straight-sided, or only slightly curved at the sides, front and rear end.

In the following claims, unless otherwise specified: the term "vehicle adapted to traverse land" signifies a vehicle that traverses land only or traverses land and flies in the air or a hovercraft or space craft adapted to traverse land and the air; the word "holes" means an opening thru an element or an opening or depression into but not thru an element; "socket" means a hole or depression extending partially thru an element; the term "bonding material" signifies adhesive, welding, brazing, solder or the like; "gaseous material" means gas, gas-cell-containing foamed plastic, or gas mixed with insultating fibers or other particles; "gas" means any pure gas, air or any other mixture of gases; "plastic": any type of synthetic or natural plastic, including rubber; "stucco": aggragate or fibers mixed with cement (Portland cement or Portland cement mixed with lime, lime, epoxy, or other cement); and the term "rod-like elements" means nails, bolts, screws, or the like.

I claim:

1. A vehicle adapted to traverse land, including:

floor structure, having load-containing space above it;

sidewall framework, connected to said floor structure, comprising: a plurality of sidewall beams of vehicle-strength-providing material, including pairs of spaced-apart, oppositely-positioned beams, each pair having spaced-apart, opposite surfaces of the two beams and opposite holes that extend into said material from said surfaces, each of said holes at one of the surfaces of the two beams opening toward and aligned with a similar, opposite hole in the other of said two beams;

hollow members of vehicle-strength-providing material, connecting and bracing said opposite beams, each of said hollow members having ends extending into and braced in an aligned pair of said opposite holes; and securing means, holding said ends in said holes and said hollow membes in vehicle-strength-providing assembled relation;

lower land-traversing structure, fixed to said floor structure, comprising: a plurality of lower-structure beams of vehicle-strength-providing material, including pairs of opposite, spaced-apart, lower-structure beams having a plurality of opposite holes that extend into said material from opposite-beam surfaces of each pair of said lower-structure beams, each of said last-named opposite holes at one of said opposite-beam surfaces opening toward and aligned with a hole in the other of said opposite-beam surfaces; lower-structure hollow members of vehicle-strength-providing material, connecting and bracing said opposite lower-structure beams, each of said lower-structure hollow members having ends extending into an aligned pair of said last-named opposite holes; securing means holding said ends of the lower-structure hollow members in said last-named holes and in vehicle-strength-providing assembled relation; and means for facilitating overland travel, supported by some of said beams;

waterproof, vehicle-strength-providing, exterior skin means, connected to outer portions of said sidewall framework and said lower structure; and vehicle-strength-providing, interior skin means, connected to inner portions of said sidewall framework.

2. A vehicle as set forth in claim 1, in which said lower structure includes: a pair of separated housings of vehicle-strength-providing material; and said means for facilitating travel includes means in each of said housings for facilitating travel over a hard medium, having lower surfaces adapted to engage the said medium.

3. A vehicle as set forth in claim 1, in which: said travel-facilitating means, on each side of said vehicle, includes a wheel; and the lower surfaces of the wheel are clear of said hard medium in normal straight travel, but engage said medium on sidewise tilting of the top of the vehicle toward said wheel.

4. A vehicle as set forth in claim 1, in which: each of said hollow members comprises a bottle, having a neck of smaller cross-sectional area than that of its middle portion; and at least one of each aligned pair of said opposite holes has a cross-sectional area of a size that is in the neighborhood of that of said smaller cross-sectional area.

5. A vehicle as set forth in claim 1, in which said securing means comprises bonding material, set from previous shapeless condition.

6. A vehicle as set forth in claim 5, in which said bonding comprises epoxy.

7. A vehicle as set forth in claim 1, in which said hollow members comprise glass bottles.

8. A vehicle as set forth in claim 7, in which each of said bottles is a used bottle of the beverage-containing type.

9. A vehicle as set forth in claim 7, in which: one of each opposite pair of said aligned holes is a socket, extending partially thru the thickness of a beam; each of said bottles has a neck and a bottom portion of larger cross-sectional area than that of said neck and is seated in said socket; and said securing means comprises adhesive, set from previous shapeless condition, on the bottom wall of said bottom portion and on sides and the closed end of said socket.

10. A vehicle as set forth in claim 1, in which: each of said hollow members is a bottle member, having a pair of necks each of which is of smaller cross-sectional area than that of the bottle member's middle portion; and each hole of each pair of said opposite holes has a cross-sectional area of a size that is in the neighborhood of the size of said smaller cross-sectional area.

11. A vehicle as set forth in claim 10, in which said bottle member is composite and comprises two bottles having their bottoms fastened togehter.

12. A vehicle as set forth in claim 10, in which said bottle member includes: two bottles of glass, having adjoining bottoms; and bonding material, set from previous shapeless condition, between and strongly uniting said bottoms.

13. A vehicle as set forth in claim 10, in which said bottle member is unitary and of integral material, set from previous plastic condition.

14. A vehicle as set forth in claim 13, in which said integral material is glass.

15. A vehicle as set forth in claim 1, in which: said sidewall beams include stringers, at least some of which extend in fore-and-aft direction; and the said hollow members between said stringers are upright and contain gaseous material.

16. A vehicle as set forth in claim 15, in which said stringers are parallel.

17. A vehicle as set forth in claim 15, in which the said material of the hollow members comprises glass.

18. A vehicle as set forth in claim 15, in which each of said upright hollow members comprises a neck portion at each of its ends which is smaller in cross section that its middle part.

19. A vehicle as set forth in claim 1, in which: the said sidewall beams are arranged in units of end-to-end-joined beams; and said framework includes fastening means, bracingly joining ends of the beams of each unit.

20. A vehicle as set forth in claim 1, in which: the said material of the sidewall and lower-structure beams is of a type which frictionally holds nails; and the said exterior skin means includes: mesh on outer surfaces of said beams; rod-like elements, penetrating said beam material and fastening said mesh to the beams; and stucco comprising cement on said mesh, set from previously plastic stuccoing condition.

21. A vehicle as set forth in claim 20, in which the said interior skin means includes: mesh on inner surfaces of said beams; rod-like elements, penetrating said beam material and fastening said last-named mesh to the beams; and stucco comprising cement on said last-named mesh, set from previously plastic condition.

22. A vehicle as set forth in claim 20, in which: said cement comprises Portland cement; and said stucco further comprises inert fragments mixed with said cement.

23. A vehicle as set forth in claim 1, in which said sidewall beams include ribs, extending in planes that are transverse to the vehicle's fore-and-aft axis.

24. A vehicle as set forth in claim 23, in which each of said ribs has a pair of planar surfaces that are wider than the maximum cross-sectional dimension of a said hollow member along a plane normal to its axis and has a median plane between said planar surfaces; and the said median planes of each of a plurality of groups of said ribs divergingly radiate from a common line of intersection of the planes.

25. A vehicle as set forth in claim 1, in which: each of said beams has other holes, extending entirely thru the beam, in vehicle construction adapted for passage of foaming, applied-in-situ foamed-plastic materials; said exterior and interior skin means comprises material capable of resisting yielding outward under the pressure of foaming foamed-plastic materials; and the said vehicle includes foamed plastic set from previously fluent condition, between each adjacent pair of said beams, in said other holes, and between said hollow members and said exterior and interior skin means.

26. A vehicle as set forth in claim 3, further comprising lighter-than-air balloons located on sides of the vertical plane containing the fore-and-aft axis of the vehicle, aiding gyroscopic force in holding said wheels normally clear of the said medium in straight travel.

* * * * *